United States Patent [19]

Staley et al.

[11] 4,286,010
[45] Aug. 25, 1981

[54] INSULATING MICA PAPER AND TAPES THEREOF

[75] Inventors: Ronald W. Staley, Barrington; Jonathan W. Roberts, Dover, both of N.H.

[73] Assignee: Essex Group, Inc., Fort Wayne, Ind.

[21] Appl. No.: 82,250

[22] Filed: Oct. 5, 1979

[51] Int. Cl.³ .................. B32B 27/14; B32B 25/02
[52] U.S. Cl. ............................ 428/215; 428/241; 428/251; 428/324; 428/428; 428/430; 428/441; 428/454; 428/480; 428/483; 428/521
[58] Field of Search ............ 428/241, 251, 324, 428, 428/430, 441, 454, 480, 483, 521, 215

[56] References Cited

U.S. PATENT DOCUMENTS

| | | | |
|---|---|---|---|
| 2,835,642 | 5/1958 | Safford | 428/324 |
| 3,867,245 | 2/1975 | Herman | 428/324 |
| 4,157,414 | 6/1979 | Smith | 428/324 |

Primary Examiner—Marion McCamish
Attorney, Agent, or Firm—Harry J. Gwinnell

[57] ABSTRACT

An electrical insulation material comprising a B-staged hydrocarbon elastomer impregnated mica paper is described. This material combined with a glass scrim and a plurality of polymeric sealing layers provides electrical insulation tape with superior properties. The conformable mica insulation tape is characterized by high flexibility, high conformability, and improved electrical insulating and stability properties. Upon wrapping to such things as electrical coils and subsequently curing, the tape provides excellent electrical properties and high heat resistance. The tape is sealable and especially adapted to stringent, for example, high temperature, environments.

5 Claims, 7 Drawing Figures

INSULATING MICA PAPER AND TAPES THEREOF

BACKGROUND OF THE INVENTION

1. Field of the Invention

The field of art to which this invention pertains is composite insulation material with structurally defined elements including impregnation or bond.

2. Description of the Prior Art

Because of constant changes in the electrical insulation industry in the size and output of various motor systems, there exists a constant search for insulation systems which will increase operating temperatures of the various motors produced without sacrificing efficiency. This has resulted in a continuing search for insulation systems to meet these new high temperature requirements. And while commercially available, high temperature resistant resins such as polyimides and high temperature stable silicones have been used to make higher temperature stable systems, the search for a tape system with ever increasing performance properties is constantly continuing. Considering the vast numbers of exotic chemical composites and various permutations and combinations thereof attempted by chemists in the insulation industry, one is struck by the fact that even though many hydrocarbon elastomers have excellent electrical properties and indeed have been used to good advantage in applications such as cable transformers, very little effort has been made to combine such materials with the excellent insulator mica, or to produce an acceptable insulating tape incorporating such materials.

BRIEF SUMMARY OF THE INVENTION

The present invention is directed to the combination of mica paper with a B-staged hydrocarbon elastomer impregnant to give a material with both superior insulating properties and high temperature stability.

Another aspect of the invention is a very flexible, highly conformable electrical insulation tape system incorporating such impregnated mica paper along with glass reinforcement and a plurality of polymeric sealing layers to give a sealable tape with superior properties especially in stringent, e.g., high temperature, environments.

DETAILED DESCRIPTION OF PREFERRED EMBODIMENTS

Figure 1:
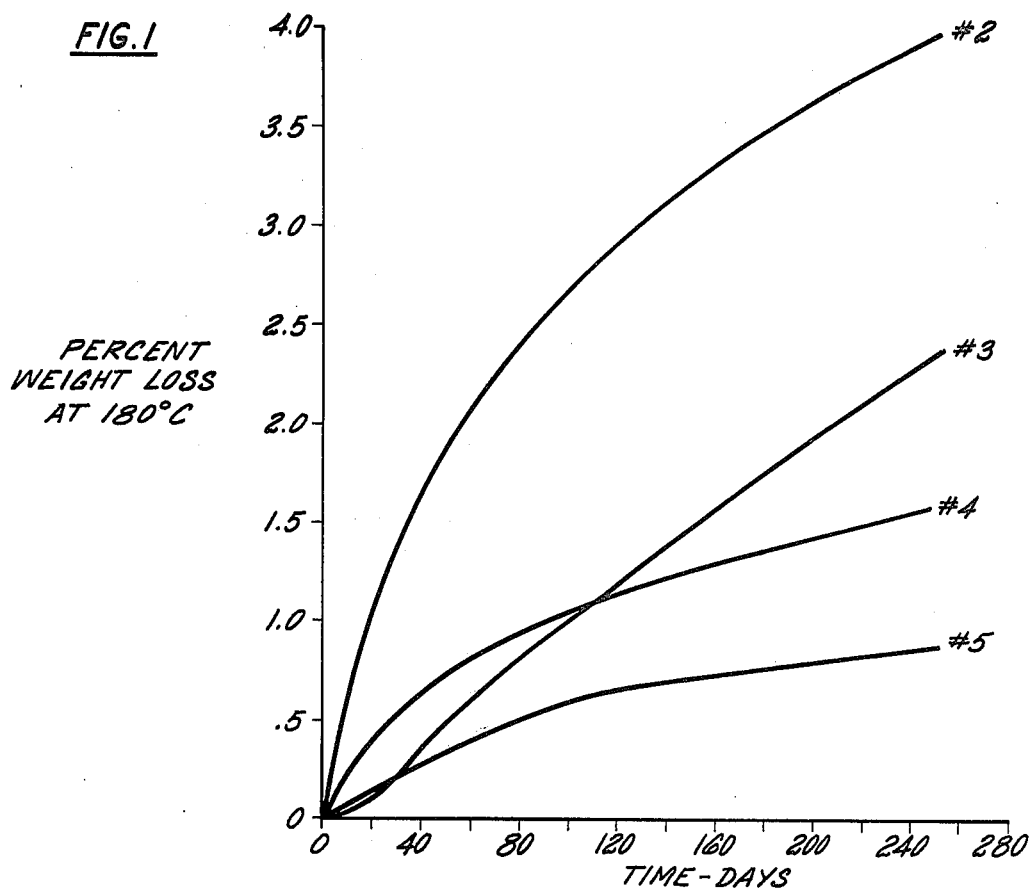
FIGS. 1-3 demonstrate relative weight loss of the hydrocarbon system of the present invention compared to other conventional polymer systems.

One of the essential components of the insulation system of the present invention is the mica paper impregnated with a B-staged hydrocarbon resin. While any conventional mica can be used in sheets of any desired thickness, muscovite, because of its dielectric strength, in thickness up to 10 mils and especially about 1.8 to 10 mils is preferred. Phlogopite is another mica of note because of its outstanding high temperature properties.

As the B-staged hydrocarbon polymer, the polybutadienes, because of their outstanding electrical properties, are preferred. Specifically, the Lithene ® A series (Lithium Corporation of America) of polybutadienes of high molecular weight (e.g., in excess of about 900 and especially in excess of about 1800 weight average molecular weight) containing the following groups are preferred:

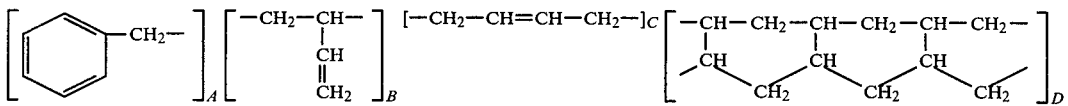

The preferred polybutadiene polymer comprises by weight about 5% terminal phenyl groups (A), about 38 to about 47.5% of the 1,2 vinyl component (B), about 9.5 to about 19% of the 1,4 component (C) in trans-form and about 4.75 to about 9.5% of the 1,4 component in the cis-form, and about 28.5 to about 38% of the cyclized component (D).

While any conventionally employed reinforcing backing can be used for the mica tape of the present invention such as nonwoven glass mats or glass strips or fiber, woven glass mats such as Cloth Styles 2121 and 1297 provided by Burlington Glass and J. & P. Stevens are particularly preferred. The third and fourth components of the tape can be used in combination or alternatively. To insure that the mica-polybutadiene impregnant does not migrate out of the tape during processing, storing and subsequent handling, polymeric sealing layers are applied to both sides of the impregnated mica paper-glass scrim composite. The preferred sealing layer on the glass scrim side of the tape is a styrene-butadiene or isoprene-butadiene A-B-A block copolymer. The Kraton ® series of such polymers (Shell Oil Company) are preferred (e.g., Nos. 1101, 1102 and 1107) and Kraton 1107 especially preferred. Tthe preferred sealing polymer on the mica side of the tape is a polyester film such as Mylar ® (DuPont DeNemours and Co., Inc.). In addition to the styrene-or isoprene-butadiene block copolymer, another polymer layer such as the Mylar on the glass scrim side of the tape can also be used. Again, the key is sealing of the mica impregnant and securing the glass scrim. The polyester layer not only serves as a backing for the mica and glass scrim, but has excellent insulating properties as well. Furthermore, it imparts improved extensible properties to the tape, i.e., allows the tape to be wrapped, twisted and bent while maintaining its exceptional tape integrity.

In the process of making tapes of the present invention, after impregnation of the mica-glass scrim with the polybutadiene, a light coating of the compatible sealing polymer (e.g., block copolymer) is applied to the composite, e.g., with a kiss roller. While the exact amount of the sealing polymer applied in this manner has not been measured, sufficient amount should be applied as stated above to prevent squeeze out of the polybutadiene and displacement of the glass scrim during rolling, slitting, rerolling, storage, and handling of the mica tape. This sealing polymer is believed to represent about 5 to about 15 weight percent of the total polymer content of the tape. It should also be noted that an embodiment of the present invention includes two layers of polyester, one on either side of the tape.

EXAMPLE 4,086 grams of polybutadiene resin (Lithene AH, Lithium Corporation of America) having an approximate weight average molecular weight of 1,800 was dissolved in 8,172 grams of toluol containing approximately 41 grams of dicumyl peroxide curing agent to give a 33.4% by weight solids solution. An approximately two mil thick sheet of muscovite was brought in contact with an about 2.5 mil thick glass scrim (Cloth Style 2121) and the polybutadiene resin solution roller coated onto and into the mica sheet through the glass scrim. This was followed by roller coating a polymer sealing layer comprising an isoprene-butadiene A-B-A block copolymer binder solution onto the glass scrim. The sealing layer in this particular example was cast from a solution comprising 6.7 pounds of toluene, 1.32 grams of an anti-oxidant (Irganox 101, Ciba Geigy), diallylthiodipropanate 0.66 grams, Weston 618 anti-oxidant 0.66 grams, and an isoprene-butadiene A-B-A block copolymer (Kraton 1107) 0.58 pound. The thus coated tape is platen heated from below at a platen temperature of about 375°–450° C. Following application of the coatings, the tape (Tape #1) is heat treated in a drying oven at about 325° F. to a substantially tackfree state, but in a time frame so as not to initiate cure of the polybutadiene. Upon exit from the drying oven, a layer of polyethyleneterephthlate film was applied in a thickness of about 0.25 mil to that side of the mica tape opposite the glass scrim and the composite run through heated calender rollers at about 300° F. A second sample (Table #2) was formed in the same manner as the first sample but including an additional layer of polyethyleneterephthlate film on the block copolymer layer of the first sample. This polyester layer was applied to the same location in this manner as the first polyester layer of the first sample. The properties of the respective tapes are shown in Table I. Both tapes had a residual solvent (toluol) content of about 0.5% by weight.

TABLE I

|  | Tape #1 | Tape #2 |
| --- | --- | --- |
| Binder Content: | 20–25% | 20–25% |
| Thickness: (ASTM D374. Method C) | 0.0050" | 0.0053" |
| Approximate Weight: | 0.028 Lbs./Sq. Ft. | 0.031 Lbs./Sq. Ft. |
| Gurley Stiffness @ 75° F.: | 500 Mg. | 600 Mg. |
| Dielectric Strength: | 800 Volts/Mil Avg. | 1200 Volts/Mil Avg. |
| Bar Dielectric: (Half-Lap Wrap) |  |  |
| One Layer: | 3.1 KV | 4.5 KV |
| Two Layers: | 6.9 KV | 8.5 KV |
| Three Layers: | 8.9 KV | 10.5 KV |
| Dissipation Factor: (40 Volts/Mil, 2 layer laminate) | 155° C.: 1.4% |  |

As a further indication of the superiority of properties the polybutadiene resin provides in this environment, attention is directed to Tables II and III and the respective Figures. The determination of weight loss expressed as a percent based on the original weight is a very simple technique which gives a good indication of resin suitability in this environment for a particular resin system.

TABLE II

| Resin System #1: | Bisphenol A Anhydride Cure |
| --- | --- |
| Resin System #2: | Novolac Epoxy* 3% BF$_3$400 MEA |
| Resin System #3: | Novolac Epoxy 3% BF$_3$400 MEA (Hot Melt) |
| Resin System #4: | Novolac Epoxy* (Medium Molecular weight) 50 phr Phenolic novolac |
| Resin System #5: | Novolac Epoxy* (low molecular weight) 50 phr Phenolic novolac |
| Resin System #6: | Bisphenol A Epoxy* (low molecular weight) 50 phr Phenolic novolac |
| Resin System #7: | B-staged Hydrocarbon Elastomer (solvent solution) |
| Resin System #8: | B-staged Hydrocarbon Elastomer (Hot Melt) |
| Resin System #9: | Commercial hydrocarbon formulation** (no solvent) |

*These castings were all made from acetone solution of the resins.
**Rated at Class 180° C.

TABLE III

| Resin System | Dissipation Factor of Laminates (ASTM D150) | At 155° C. and 40 Volts/Mil |
| --- | --- | --- |
| #1 | 2 layers 0.006" mica paper | 8.8% |
|  | 1 layer polyamide paper | 14.7% |
|  | 2 layers polyamide and mica paper | 14.5% |
| #2 | 4 layers 0.004" mica paper | 4.7% |
| #4 | 4 layers 0.004" mica paper | 2.6% |
| #5 | 4 layers 0.004" mica paper | 8.8% |
| #6 | 4 layers 0.004" mica paper | 11.0% |
| #7 | 4 layers 0.004" mica paper | 0.6% |

The weight loss due to thermal degradation of the resin system creates entrapped gases which produce voids in the insulation material. This in turn will decrease the insulation efficiency and will be reflected by an increase in the power factor. As the voltage stress surpasses the critical gradient of each void, internal ionization (corona) will manifest itself. The ionization process (depending on its intensity) will increase the rate of degradation by creating localized not spots. The increase in temperature due to the ionization in conjunction with normal operating temperatures presents a potential avalange effect. The creation of voids due to high resin weight loss will also degrade the degree to which the insulation can withstand mechanical stress. A resin system which not only exhibits excellent electrical properties but also a low weight loss profile would be a highly desirable candidate for an insulation system. In the examples of Table II, a very simple technique which involved curing approximately 10 grams of the resin systems listed in an aluminum dish and measuring the weight loss after exposure to selected temperatures was performed. All the resins described in Table II were given a final cure of 16 hours at 300° F. to insure complete cure. A temperature of 180° C. was chosen as the measuring temperature because of its use as a standard aging temperature for class F (155° C.) materials.

Resin system #4 which is based on a medium molecular weight novolac epoxy had a greater weight loss than the lower molecular weight novolac epoxy resin #5 or the bisphenol A epoxy resin #6. This was thought to be due to entrapped solvent since the difference still persisted after 250 days. Resin system #3, also a $BF_3$-monoethylamine complex ($BF_3$400 MEA) cured epoxy continued to rise rapidly on a long-term basis.

Figure 2:
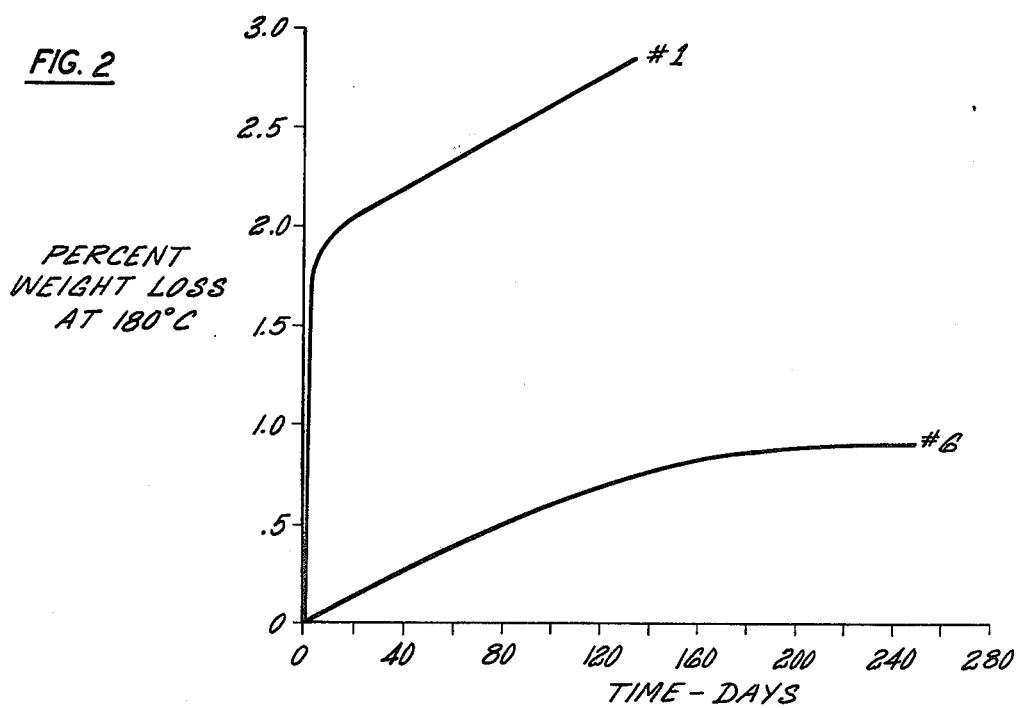
Figure 3:
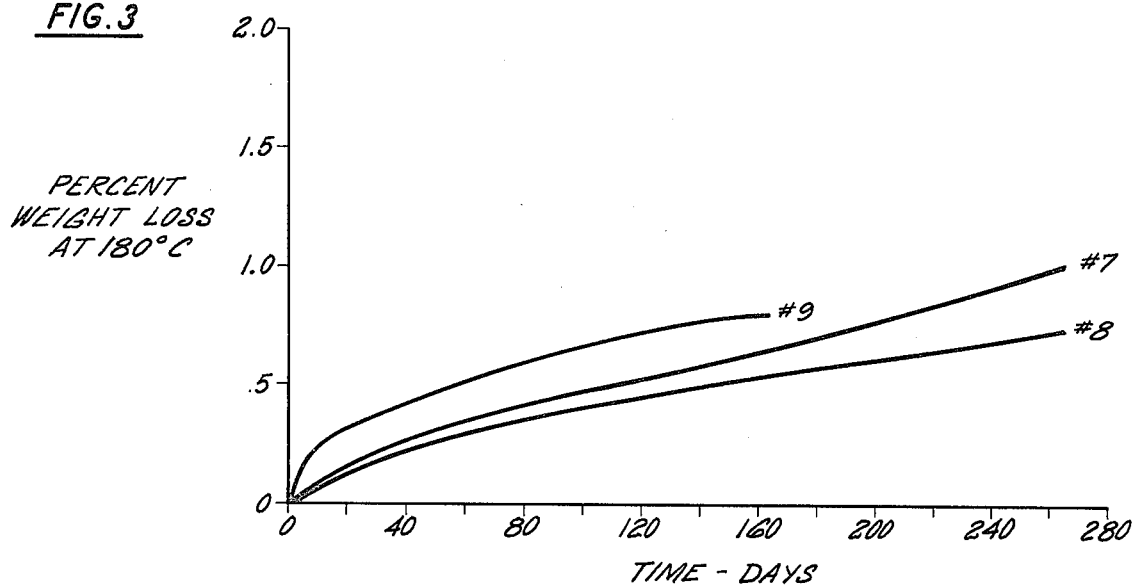

By referring to FIGS. 1 to 3, it can be seen that the B-staged hydrocarbon elastomer systems of the present invention are equal to or better than any of the resin systems compared. Again it should be pointed out that the slightly higher weight loss of system #7 may be due to entrapped solvent. Resin systems #8 and #3 utilized a hot melt process to uniformly distribute the curing agents and thus eliminated solvents as a possible variable. Here again, the B-staged hydrocarbon elastomers of the present invention exhibit considerably lower weight loss at 180° C. It should also be noted that the solvent based counterparts to resin systems #8 and #3 which are resin systems #7 and #2, respectively, both demonstrate a greater weight loss than their nonsolvent based counterparts, the B-staged hydrocarbon elastomer of the present invention still being the better of the systems. Since these castings are representative of their respective resin systems, a direct comparison can be drawn. It can be seen that the weight loss profiles of the B-staged hydrocarbon elastomers of the present invention show a significant improvement over other conventional systems. It should also be noted that in FIG. 3, a commercial hydrocarbon system #9 which is rated for 180° C. had significantly higher weight loss than either resin systems #7 or #8.

A second key property of the composites of the present invention is the dissipation factor of the composite. In the following examples, mica paper composites of the present invention were compared with composites made with conventional polymers above listed. Four mil mica sheets were selected and treated with solutions of resin systems #1, #2, #4, #5, #6 and #7. The mica paper layers were desolvated for 30 minutes at 200° F. At this point, they all contained 25-30% by weight polymer. Each laminate was constructed by stacking four layers each four inches square of the treated mica paper then pressing for 16 hours at 300° F. At the end of the press cure which was controlled to minimize loss of resin, the laminates appeared clear and sound. The dissipation factors determined according to ASTM D-150 at 155° C. and 40 volts per mil are shown in Table III. As can be seen, the dissipation factor of resin system #7, the B-staged hydrocarbon elastomer of the present invention, is outstanding at only 0.6%. While resin #4, the medium molecular weight novolac epoxy cured with 50 parts per hundred of phenolic novolac, and resin system #2, the medium molecular weight novolac epoxy cured with 3% $BF_3$-monoethylamine complex ($BF_3$400 MEA) are excellent, they are not nearly as good as the B-staged hydrocarbon elastomer of the present invention.

Figure 4:
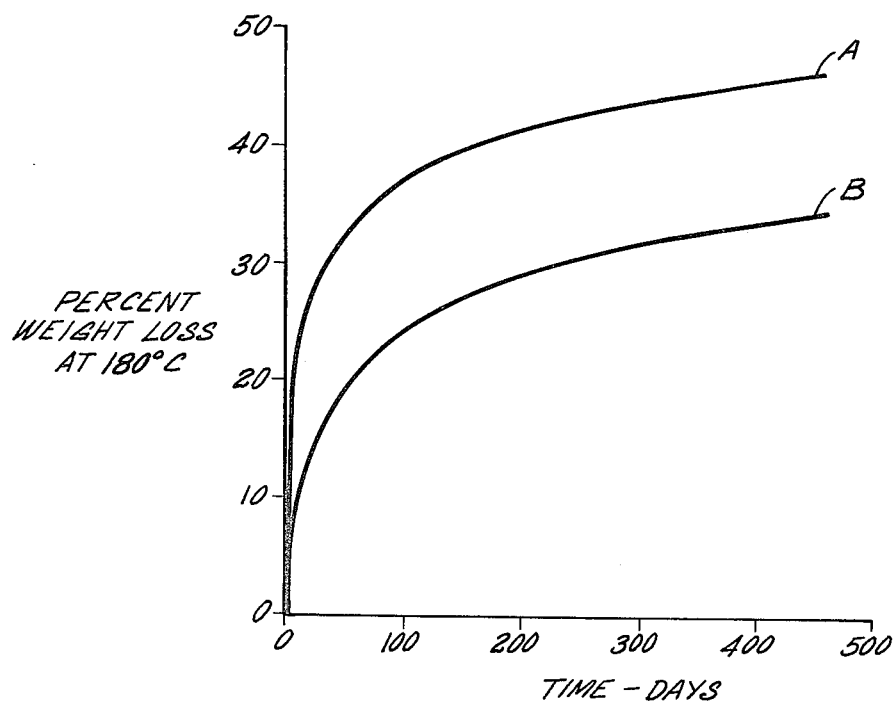
FIG. 4 demonstrates relative weight loss of an exemplary tape of the present invention with a conventional tape.
Figure 5:
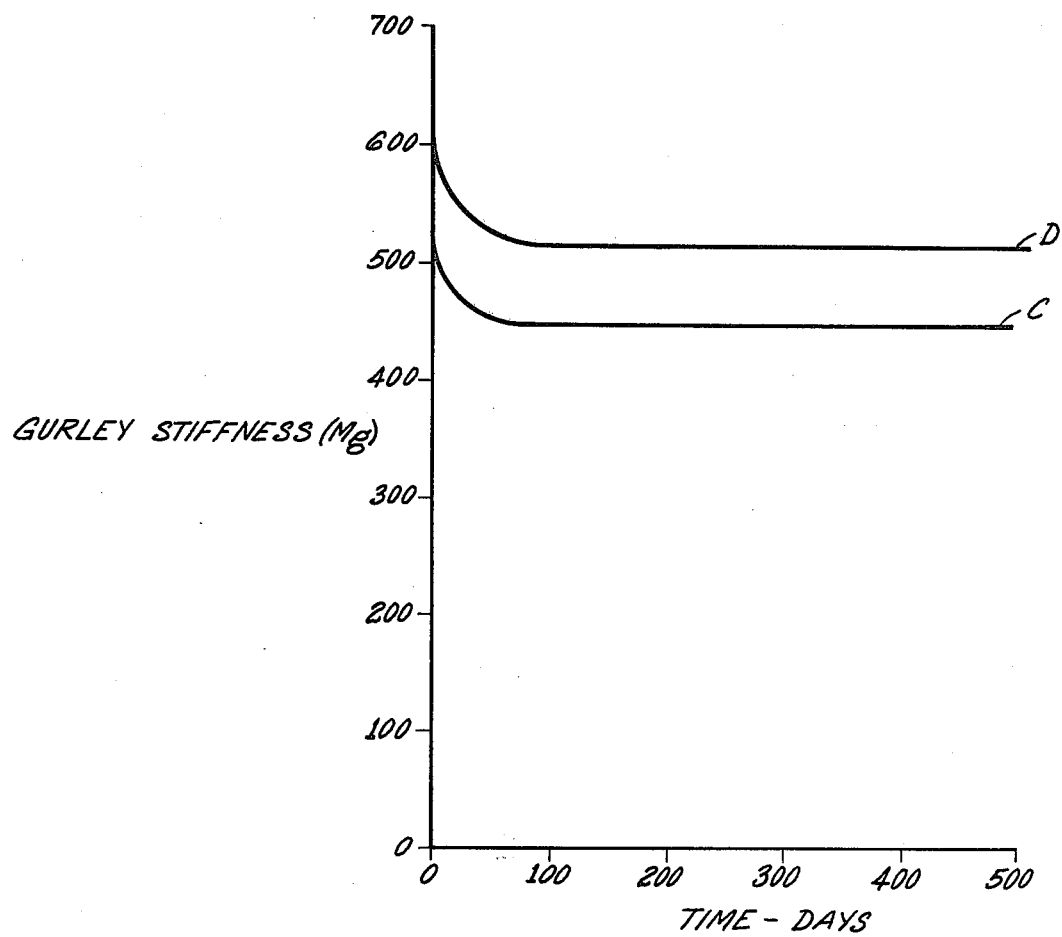
FIG. 5 demonstrates relative stiffness of two exemplary tapes of the present invention.

The two tapes described in the example were also run through a series of tests demonstrated by FIGS. 4 and 5. Both of these tapes had excellent flexibility and conformability when taped to $\frac{3}{8}$ inch$^2 \times 20$ inch long test bars. Because of the B-staged nature of the tape, the polymers provided for a snug fit of the tape on the bar, which is another advantage of the tapes of the present invention. Weight loss tests were done on Tape 2 and compared to a competitive high performance polyester tape with a similar construction. These results are shown in FIG. 4. It can be readily seen that the hydrocarbon elastomer tape shows a significantly lower weight loss than the competitive tape.

Because B-staged resins are often suspect when it comes to shelf life, a study was made of Gurley stiffness versus time of the B-staged tapes of the present invention. The tests were performed on a three-quarter inch by three and one-half inch specimen of tape using a W. & L. E. Gurley stiffness tester. The results are shown in FIG. 5. After nearly one and one-half years of storage, the tapes remained flexible and conformable. In fact, if anything, the flexibility has improved with time (the lower the number, the better the flexibility). This is a clear indication that the ability of the tapes of the present invention to cure and form a tough laminate will not be lost during prolonged storage periods. Voltage endurance testing was also performed on laminates made from tapes made according to the example and compared with various insulation materials. The basic circuit used was extracted from ASTM D2275. In order to intensify corona, a steel needle was used as a top electrode and a flat plate was used for the bottom. All samples were preconditioned for 48 hours at 50° C. plus 5 hours over anhydrous calcium chloride. Ten specimens of each insulating material were tested. The results are shown in Table IV. Significantly, there have been no failures with the B-staged hydrocarbon Tape #1 of the present invention.

Laminates made of the B-staged hydrocarbon tape of the Example by pressing four layers at approximately 15 psi for 4 hours at 300° F. was performed. They were then put between quarter inch steel plates with 8 mil Teflon separators and torqued down to a standard value setting of 10 ft-lbs. After 103 days at 180° C., the samples were still too flexible to be broken in a flexural tester. This demonstrates the outstanding thermal classification of the tapes of the present invention.

Twenty-two hundred volt coils taped to a two-layer half lapped tape of the Example, three-quarter inch wide and without armor were wrapped with two layers of heat shrink polyester film with and without steel pieces on the sides of the coil. After an overnight bake at 300° F., the coils were stripped and tested. With or without shaping pieces, the slot sections tested at 8-10 kilovolts. Dissipation factor tests run with the shaping pieces still on were 5.8% at 155° C. at 10 volts per mil and 6.6% at 60 volts per mil.

Figure 6:
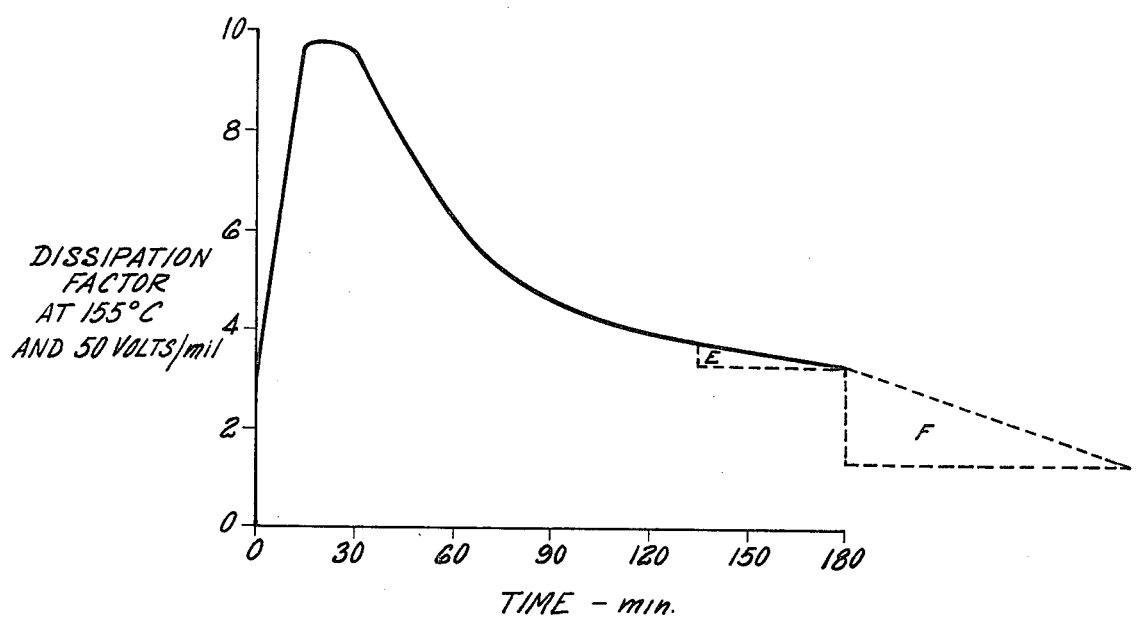
FIG. 6 represents the dissipation factor of a tape of the present invention upon curing.

FIG. 6 demonstrates what can be expected in change of dissipation factor with increasing cure time of the polybutadiene of the present invention.

TABLE IV

| | | Hours To Failure $\left(\frac{\#5 + \#6}{2}\right)$ | |
|---|---|---|---|
| | | 0.010" @ 5000 Volts RMS | 0.005" @ 2500 Volts RMS |
| 1. | Polyethylene terephthalate Film | 77.6 | 216.0 |
| 2. | Polyimide Film | — | 68.2 |
| 3. | Polyamide Paper | 4.9 | 5.3 |
| 4. | Polyamide and Mica Paper | — | 421.8 |

TABLE IV-continued

| | | Hours To Failure $\left(\frac{\#5 + \#6}{2}\right)$ | |
|---|---|---|---|
| | | 0.010" @ 5000 Volts RMS | 0.005" @ 2500 Volts RMS |
| 5. | Polyamide Paper Plus Resin System #1 | 135.3 | — |
| 6. | Polyamide and Mica Paper Plus Resin System #1 | 700.3 | — |
| 7. | Mica Paper Tape #1 3 Layer Laminate | *1389.0 | — |

*No Failures.

It can be concluded from this graph that the tape is substantially cured after 90 minutes at (155° C.) and the test further demonstrates the suitability of the tape for in-use curing. The last point on the graph (the furthermost point in the F triangle) was a measurement taken after 67 hours. The tape used in this example was a tape made by the process of Tape #1 of the Example. By calculating the slopes of the sections E and F of the graph it was estimated that a dissipation factor equivalent to that of the last point on the graph could be achieved after 6.6 hours of heating. The dissipation factor on this graph was measured in terms of dielectric loss angle (tan $\delta \times 10^2$). Measurements were taken at a constant heating of 155° C. and at an applied voltage of 50 volts/mil. The measurements were taken in the same manner as those for Table III. One layer of tape was used.

Figure 7:
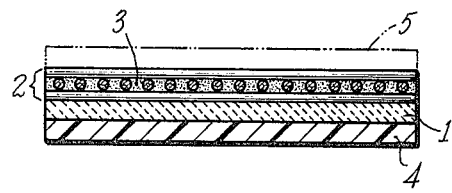
FIG. 7 represents schematically a tape of the present invention.

FIG. 7 demonstrates schematically a tape made according to the present invention. In the Figure, 1 indicates the impregnated mica layer, 2 indicates the glass scrim and 3, 4 and 5 indicate the polymeric sealing layers. The sections 3 and 5 of the schematic represent the second polymeric sealing layer (4 being the first such as a polyester) which can, for example, be a block copolymer such as disclosed or a block copolymer (3) overlaid with a polyester (5). It should also be noted that either one of the polymeric sealing layers can be a plurality of sealants, e.g., the polyester films coated with the A-B-A copolymers and bonded copolymer side facing the mica to the mica-glass cloth composite.

In summation, a highly flexible, conformable tape has been invented from mica paper bonded with a B-staged hydrocarbon elastomer. The tape cures to a tough rubbery mass after the coils have been taped and the machine is wound. The tape can also be allowed to cure in service. The tapes have a minimal weight loss at 180° C. and the dissipation factor at 155° C. is outstanding. It should be also noted that no dermititis problems have been seen after years of work in the laboratory, private work in the factory, and various taping trials. The shelf life is at least a year and a half at ambient room temperature and probably longer. The tape is not susceptible to moisture, is sealable and has great potential in severe environments. It also appears to be suitable for high voltage applications since it has superior voltage endurance. And its heat aging is exceptional at elevated temperatures.

Although this invention has been shown and described with respect to a preferred embodiment, it will be understood by those skilled in this art that various changes in form and detail thereof may be made without departing from the spirit and scope of the claimed invention.

Having thus described a typical embodiment of our invention, that which we claim as new and desire to secure by Letters Patent of the United States is:

1. An electrical insulation tape comprising:
   (a) a sheet of mica paper impregnated with 10 to 35% by weight of a B-staged polybutadiene polymer;
   (b) a woven glass scrim next to the mica paper;
   (c) a block copolymer sealing layer selected from the group consisting of an isoprene-butadiene and styrene-butadiene next to the glass scrim; and
   (d) a polyethyleneterephthlate sealing layer next to the mica on that side of the mica opposite the glass scrim.

2. The tape of claim 1 additionally containing a layer of polyethyleneterephthlate next to the block copolymer sealing layer.

3. The tape of claims 1 or 2 wherein the mica paper is about one to about ten mils thick, the glass scrim is about one to about four mils thick, the block copolymer layer is up to 0.3 mil thick, and the polyethyleneterephthlate layer is up to about one mil thick.

4. The article of claim 1 wherein the polybutadiene comprises by weight about 5% terminal

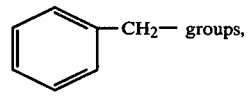

about 38 to 47.5%

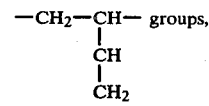

about 9.5 to about 19%. —CH$_2$—CH=CH—CH$_2$— groups in the trans- form and about 4.75 to about 9.5% in the cis- form, and about 28.5 to about 38%

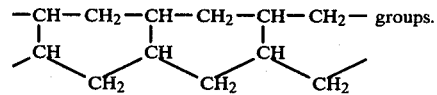

5. The article of claim 1 wherein the mica is muscovite or phlogopite.

* * * * *